March 17, 1959 N. KLOMPAS 2,877,623
ANNULAR FAIRING STRUCTURE FOR THE REAR FRAME
HOUSING OF A GAS TURBINE ENGINE
Filed Nov. 27, 1956 2 Sheets-Sheet 1

INVENTOR
N. KLOMPAS
BY: Maybee & Legris
ATTORNEYS

March 17, 1959  N. KLOMPAS  2,877,623
ANNULAR FAIRING STRUCTURE FOR THE REAR FRAME
HOUSING OF A GAS TURBINE ENGINE
Filed Nov. 27, 1956  2 Sheets-Sheet 2

INVENTOR
N. KLOMPAS
BY: Maybee & Legris
ATTORNEYS

United States Patent Office 2,877,623
Patented Mar. 17, 1959

2,877,623

ANNULAR FAIRING STRUCTURE FOR THE REAR FRAME HOUSING OF A GAS TURBINE ENGINE

Nicholas Klompas, Beverley Hills, Ontario, Canada

Application November 27, 1956, Serial No. 624,703

7 Claims. (Cl. 60—35.6)

This invention relates to the annular fairing structure that defines the inner limit of the annular flow path of the exhaust gases in a gas turbine engine, and particularly to the means for supporting such structure on the rear frame housing of the engine.

After passing through the turbine, the exhaust gases flow through an annular passage between the outer casing of the engine and an annular fairing that surrounds the rear bearing of the engine and the parts associated with it. The fairing is secured to the rear frame housing of the engine, within which the rear bearings are supported. This fairing structure is subject to dangerous vibration caused by the rotation of the shaft and the turbine rotors. If the fairing structure is rigidly mounted, the vibration may reach dangerous proportions, and the object of the invention is to provide means for mounting the fairing that will tend to dampen such vibration from the shaft.

To dampen the vibration effectively it is helpful to provide limited relative motion between the fairing and the rear frame housing at all supporting points where these parts are in contact. It is also desirable to obtain from the supporting structure indirect additional support for the shaft itself so as to dampen vibration caused by its critical whirling speed.

These objects are achieved by the embodiment of the invention described in the accompanying description and drawings. In the drawings—in which each reference numeral denotes the same part in the various views—

Figure 1:
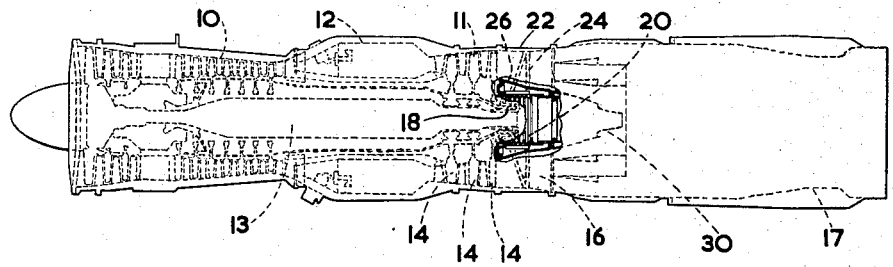
Fig. 1 is a side elevation of a typical gas turbine engine. It is partly broken away to show in section a supporting housing according to the invention.

The embodiment of the invention shown in the drawings is suitable for use in a gas turbine engine like that shown in Figure 1. It has a compressor 10 and a turbine 11 with an annular combustion chamber 12 between them and surrounding a shaft 13 that connects the turbine to the compressor. The hot gases rushing out of the combustion chamber 12 are guided into the turbine 11 to rotate the rotors 14 and thus drive the compressor; they continue rearward through an annular flow-passage 16 and issue from the tail-cone 17 as a driving jet.

Figure 2:
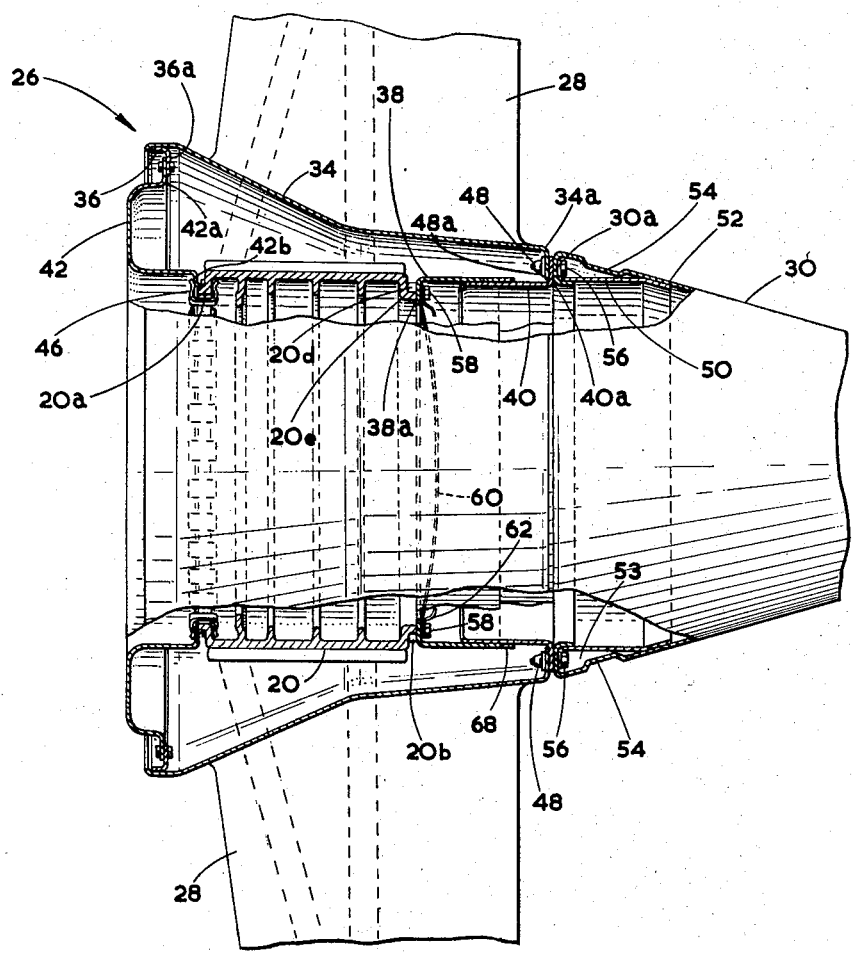
Fig. 2 is an enlarged sectional view, partly broken away, of the supporting structure shown in Fig. 1.

Surrounding the rear end of the bearings 18 that support the main shaft 13 at its rear end is a relatively rigid rear frame housing 20 connected to the outer casing 22 of the engine by the supporting struts 24. (The arrangement of these struts is not a part of the present invention.) As best seen in Fig. 2, the rear frame housing is enclosed by an annular engine exhaust frame fairing structure 26 that provides the inner wall of the annular flow passage 16; its structure is integral with vanes 28, of airfoil section, surrounding the supporting struts 24.

At the rear of the engine exhaust frame fairing structure is an exhaust bullet 30 designed to facilitate the smooth flow of exhaust gases rearward of the rear frame housing.

The general arrangement of the attachments for the fairing structure is as follows: the forward end of the exhaust bullet 30 is bolted to the rear of the fairing structure 26, a novel sleeve arrangement on the rear of the fairing structure, that permits some relative rotational movement, is bolted in turn to the rear of the rear frame housing 20, and the front of the fairing structure is clipped in a novel manner to the front of the rear frame housing; it will be seen that the fairing structure consists of a fairing proper and the sleeve arrangement, as will be described more fully below.

Dealing with the arrangement in detail, the fairing structure itself is constructed of a number of parts: (a) a substantially frusto-conical outer wall 34, that is the principal part of the fairing proper. (An annular L-channel 36 is welded to the inside of the outer wall 34, thus providing a front inner flange 36$^a$ on the outer wall, which also has a rear inner finge 34$^a$), (b) a compound sleeve member comprising telescoping sleeves 38 and 40, the rear one 40 having a rear outer flange 40$^a$ overlapping the outer wall rear inner flange 34$^a$ at the rear end of the fairing and the front one 38 having a front inner flange 38$^a$ that is bolted to the rear end of the rear frame housing, and (c) a fairing diaphragm 42 at the forward end of the fairing and shaped to conform generally to the rear configuration of the turbine rotors 14; it has a rim 42$^a$ at its outer periphery that is bolted to the front inner flange 36$^a$ on the fairing outer wall.

At its inner periphery, the diaphragm 42 has a rim in the form of an outwardly extending channel-sectioned flange 42$^b$, forming a hollow fastening flange with a radial surface 42$^c$. The flange 42$^b$ meets an inwardly extending annular fastening flange 20$^a$ on the forward end of the rear frame housing 20, that provides a radial surface 20$^b$. The fastening flange 20$^a$ has a cylindrical forward extension 20$^c$ encircling the hollow flange 42$^b$ and providing means on one of the diaphragms 42 and the housing 20 to maintain the fastening rims 42$^b$ and 20$^b$, and thus the fairing structure 26 and the housing, in concentric relationship.

Figure 4:
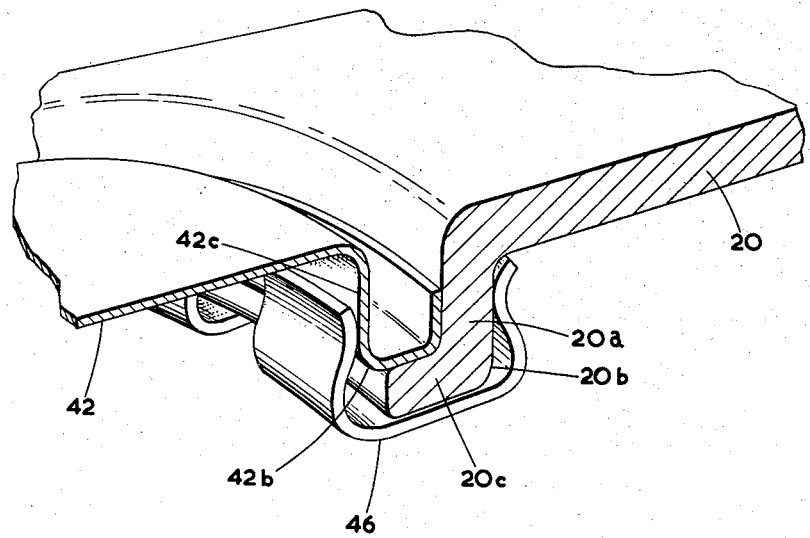
Fig. 4 is an enlarged fragmentary perspective view of the means connecting one end of the fairing to the housing.

As best seen in Fig. 4, the two fastening flanges are axially held together by a series of metal clips 46, each preferably about 1" long, overlying the edges of the rims of the diaphragm 42 and of the housing 20 and engaging the radial surfaces 42$^c$ and 20$^c$ of the rims, the clips being spaced about one inch apart. The normal diameter of the rear frame housing at this point is about nine inches, and for this diameter about fourteen clips may be used, thus providing a secure but slightly resilient connection that permits a limited amount of relative axial motion between the fairing and the housing.

At the rear of the fairing structure, a plate nut 48 with a flange 48$^a$ is secured (for instance rivetted) to the inner rear flange 34a of the fairing outer wall 34. At the forward end of the exhaust bullet is an inner channel-sectioned flange 30a that is welded to an inner cylindrical partition 50. The downstream end of the partition is welded to the inner wall of the exhaust bullet at 52 to provide a triangle-sectioned annular space 53 to which access can be had through slots 54 in the wall of the exhaust bullet. Bolts 56 passed through the flanges 30a, 40a and 34a from the rear are screwed into the plate nuts 48 to secure the exhaust bullet to the overlapping rear flanges of the sleeve 40 and of the fairing outer wall 34, thus rigidly securing the sleeve 40 to the remainder of the fairing structure as well as securing the exhaust bullet to the fairing.

At the rear of the housing 20, local bosses 20d on an inwardly and rearwardly extending L-sectioned flange 20c on the housing receive bolts 58 passed through the front flange 38a on the sleeve 38 to secure the sleeve 38 rigidly to the housing. These bolts also pick up a pressure diaphragm 60 and clips 62 that may hold an insulation blanket (not shown) on the pressure diaphragm.

Figure 3:
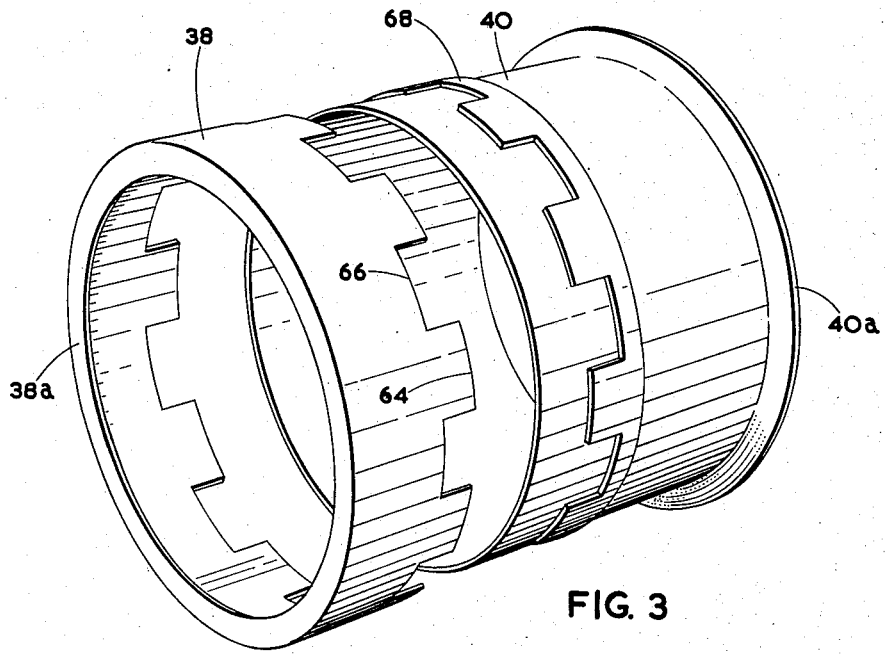
Fig. 3 is a perspective view of the novel compound sleeve member of the invention.

The manner in which the sleeves 38 and 40 telescope into each other is best seen in the enlarged view of Fig. 3; preferably the rear sleeve member 40 slides within the front sleeve member 38, which has a number of alternated tongues 64 and notches 66 equally spaced around its telescoping end so as to present a castellated end outline. An outer sleeve 68 of complementary castellated form is welded to the outside of the rear sleeve member 40 to provide notches to receive the tongues—or, which amounts to the same thing, to provide tongues received in the notches—on the end of the sleeve 38. This outer sleeve 68 is a stop member designed to limit relative circumferential motion between the two sleeves. The fit of one sleeve within the other is snug but such as to allow some relative motion with friction and the interlocking castellations are arranged with sufficient clearance to allow such rotary motion. This motion is effective in dampening vibration, while the meshed tongues and notches impose a final mechanical limit on it.

The foregoing description sets forth the best mode contemplated by the inventor of carrying out his invention, but the following claims are intended to cover all useful changes and modifications of the said mode which are within the scope of the invention.

What I claim as my invention is:

1. In a gas turbine engine having a turbine driving a main shaft mounted in bearings at the rear of the turbine and having a combustion chamber delivering hot products of combustion through an annular flow-passage past the turbine, and a rear frame housing enclosing the rear bearings of the main shaft, an annular fairing structure providing the inner wall of the flow-passage around the housing at the rear of the turbine and comprising a fairing, a compound sleeve member having a sleeve rigidly secured to the fairing and a second sleeve rigidly secured to the housing, the said sleeves being telescoped together to permit relative circumferential motion between them, a stop member engaging one of the sleeves to limit the said motion, and means resiliently connecting the fairing to the housing.

2. In a gas turbine engine having a turbine driving a main shaft mounted in bearings at the rear of the turbine and having a combustion chamber delivering hot products of combustion through an annular flow-passage past the turbine, and a rear frame housing enclosing the rear bearings of the main shaft, an annular fairing structure providing the inner wall of the flow-passage around the housing at the rear of the turbine, the fairing structure including a fairing, a sleeve on the fairing, and a second sleeve on the housing, the said sleeves being telescoped together to permit relative circumferential motion between them, a stop member engaging one of the sleeves to limit the relative circumferential motion, and means resiliently connecting the fairing to the housing.

3. In a gas turbine engine having a turbine driving a main shaft mounted in bearings at the rear of the turbine and having a combustion chamber delivering hot products of combustion through an annular flow-passage past the turbine, and a generally cylindrical rear frame housing enclosing the rear bearings of the main shaft, an annular fairing structure providing the inner wall of the flow-passage around the housing at the rear of the turbine, and comprising a fairing having front and rear ends, means connecting one end of the fairing to the housing, the other end of the fairing and one end of the housing each having a rim and the surfaces of the said rims near their edges lying closely parallel, and resilient clips overlying the two edges and engaging the two surfaces to resiliently hold the rims together and connect the fairing to the housing.

4. In a gas turbine engine having a turbine driving a main shaft mounted in bearings at the rear of the turbine and having a combustion chamber delivering hot products of combustion through an annular flow-passage past the turbine, and a generally cylindrical rear frame housing enclosing the rear bearings of the main shaft, an annular fairing structure providing the inner wall of the flow-passage around the housing at the rear of the turbine, and comprising a fairing, a sleeve rigidly secured to one end of the fairing, a second sleeve rigidly secured to the housing, the said sleeves being telescoped together to permit relative circumferential motion between them, a stop member engaging one of the sleeves to limit the said motion, the other end of the fairing and one end of the housing each having a rim, the surfaces of the said rims near their edges lying closely parallel to each other, and resilient clips overlying the two edges and engaging the two surfaces to hold the rims resiliently together and connect the fairing to the housing.

5. In a gas turbine engine having a turbine driving a main shaft mounted in bearings at the rear of the turbine and having a combustion chamber delivering hot products of combustion through an annular flow-passage past the turbine, and a generally cylindrical rear frame housing enclosing the rear bearings of the main shaft, an annular fairing structure providing the inner wall of the flow passage around the housing at the rear of the turbine, the fairing structure including a fairing, a sleeve on the fairing, and a second sleeve on the housing, the said sleeves being telescoped together to permit relative circumferential motion between them, a stop member on one of the sleeves to limit the said motion, the fairing structure also including a diaphragm shaped to conform generally to the rear configuration of the turbine rotor, the diaphragm and one end of the housing each having a rim, the surfaces of the said rims near their edges lying closely parallel, and resilient clips overlying the two edges of the said rims and engaging the two surfaces to hold the rims resiliently together and connect the fairing to the housing.

6. In a gas turbine engine having a turbine driving a main shaft mounted in bearings at the rear of a turbine rotor and having a combustion chamber delivering hot products of combustion through an annular flow-passage past the turbine rotor, a generally cylindrical rear frame housing enclosing the rear bearings of the main shaft, and an exhaust bullet located behind the housing, an annular fairing structure providing the inner wall of the flow passage around the housing at the rear of the turbine, and connecting the nose bullet to the housing, the fairing outer wall structure including a fairing, a sleeve on the fairing outer wall and a second sleeve on the housing, the said sleeves being telescoped together to permit relative circumferential motion between them, a stop member on one of the sleeves and engaging the other sleeve to limit the said motion, the fairing structure also including a fairing diaphragm shaped to conform generally to the rear configuration of the turbine rotor, the diaphragm and one end of the housing each having a fastening rim, means on one of the diaphragm and the housing to hold the rims in concentric relationship, the surfaces of the said rims near their edges lying closely parallel, and resilient clips overlying the two edges of the said rims and engaging the said surfaces to hold the rims resiliently together and connect the fairing outer wall and diaphragm to the housing.

7. The combination claimed in claim 6 in which the said second sleeve has a tongue extending axially from its telescoping end, and the said stop member is an outer sleeve welded to the outside of the said first-mentioned sleeve member, and having a notch receiving the said tongue.

References Cited in the file of this patent
UNITED STATES PATENTS 2,639,579    Willgoos _____ May 26, 1953

FOREIGN PATENTS 744,920    Great Britain _____ Feb. 15, 1956
200,199    Australia _____ Nov. 11, 1955